(12) United States Patent
Clikeman et al.

(10) Patent No.: US 6,719,932 B2
(45) Date of Patent: Apr. 13, 2004

(54) PARTICLES AND A PROCESS FOR PREPARING THE SAME

(75) Inventors: Richard Roy Clikeman, Washington Crossing, PA (US); Morris Christopher Wills, Roebling, NJ (US); Katerina Elizabeth Dukes, Philadelphia, PA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 10/253,068

(22) Filed: Sep. 24, 2002

(65) Prior Publication Data

US 2003/0031864 A1 Feb. 13, 2003

Related U.S. Application Data

(62) Division of application No. 09/179,005, filed on Oct. 26, 1998, now abandoned.
(60) Provisional application No. 60/064,623, filed on Nov. 7, 1997.

(51) Int. Cl.[7] .................................................. B01J 13/14
(52) U.S. Cl. .................... 264/4.7; 264/4.1; 264/4.33; 264/4.6; 427/213.33; 427/213.34; 523/201; 525/902
(58) Field of Search ................................. 264/4.1, 4.33, 264/4.6, 4.7; 427/213.3, 213.33, 213.34; 428/402.2, 402.21; 523/201; 525/902

(56) References Cited

U.S. PATENT DOCUMENTS

| | | | |
|---|---|---|---|
| 4,186,120 A | 1/1980 | Ugelstad |
| 4,283,499 A | 8/1981 | Howell |
| 4,336,173 A | 6/1982 | Ugelstad |
| 4,435,047 A | 3/1984 | Fergason |
| 4,677,003 A | 6/1987 | Redlich et al. |
| 4,950,052 A | 8/1990 | Fergason et al. |
| 4,992,201 A | 2/1991 | Pearlman |
| 5,107,352 A | 4/1992 | Fergason |
| 5,132,815 A | 7/1992 | Fergason |
| 5,147,937 A | 9/1992 | Frazza et al. |
| 5,237,004 A | 8/1993 | Wu et al. |
| 5,284,881 A | 2/1994 | Mizuguchi et al. |
| 5,521,266 A | 5/1996 | Lau |
| 5,639,805 A | 6/1997 | Park et al. |
| 5,835,174 A | 11/1998 | Clikeman et al. |
| 5,846,657 A | 12/1998 | Wu |

FOREIGN PATENT DOCUMENTS

| | | |
|---|---|---|
| CA | 2209630 | 11/1995 |
| CA | 2208509 | 12/1995 |
| CA | 2209685 | 1/1996 |
| EP | 0 198 089 A1 | 10/1986 |
| EP | 0 457 154 A1 | 11/1991 |
| EP | 0 769 544 A1 | 4/1997 |
| JP | 07-196747 A | 8/1995 |
| JP | 07-261163 A | 10/1995 |
| JP | 09111000 | 4/1997 |
| WO | WO 95/11265 | 4/1995 |
| WO | WO 96/13561 | 5/1996 |

OTHER PUBLICATIONS

"Preparation of Nonspherical, Monodisperse Polymer Particles and Their Self–Organization"; Journal of Colloid and Interface Science, vol. 113, No. 2, Oct. 1986; pp. 577–582.
"Swelling of Oligomer–Polymer Particles. New Methods of Preparation of Emulsions and Polymer Dispersions", Advances in Colloid and Interface Science, 13 (1980) pp. 101–140.
"New Developments in Production and Application of Monosized Polymer Particles"; Polymer Material Science and Engineering, 1986; 54.
Abstract—XP–002107787; "Monodisperse Polymeric Particles with Liquid Crystalline Cores", R. R. Clikeman, M. C. Wills and R.E. Wargo; AM–LCD 96; Digest of Technical Papers; pp. 169–172.
European Search Report—EP 98 30 8889 dated Jul. 1, 1999.

*Primary Examiner*—Rabon Sergent
*Assistant Examiner*—Thao Tran
(74) *Attorney, Agent, or Firm*—S. Matthew Cairns

(57) ABSTRACT

Disclosed are a plurality of particles having a narrow particle size distribution, a processes for forming the same, and films containing the same. The plurality of particles, includes one or more discrete polymer shells, wherein at least one of the polymer shells is crosslinked with at least one monomer containing two or more double bonds polymerizable by free radical means; and a core material encased in the polymer shells, wherein the plurality of particles have a polydispersity of from 1.3 to 1.0.

14 Claims, No Drawings

PARTICLES AND A PROCESS FOR PREPARING THE SAME

This application is a divisional of U.S. patent application Ser. No. 09/179,005, filed Oct. 26, 1998 now abandoned, which claims the benefit of U.S. Provisional Application No. 60/064,623, filed Nov. 7, 1997.

The present invention relates to a plurality of particles and a process for preparing the same. In particular, the present invention relates to a plurality of particles having a core material encased in a crosslinked polymer shell and a process for preparing the same.

At times it is helpful, to restrict a core material, for instance a liquid material, to a specific domain. Restriction of the core material controls the fluid and volatile nature of the core material, thus allowing easier management and use of the material. For example, liquid crystal domains are generally much easier to form into a uniform layer for film preparation when restricted to discrete domains.

One such means for containing a core material domain has been to disperse the core material within a polymer wherein the core material is partially or completely surrounded by the polymer. The particles so formed can then be utilized for various purposes. For instance, such particles may be dried to form a powder or film which includes the core material. Alternatively, a film may be produced from an aqueous dispersion of the particles by spreading the dispersion across a surface to form an aqueous film and removing water and any other volatiles. Also, polymer in the dispersion may be cured to form a layer of material wherein the core material is dispersed within the cured polymer.

For many applications, it is advantageous for such particles to have a narrow particle size distribution. However, conventional phase separation techniques, whereby particles are formed, generally result in particles having broad distributions in the shapes and sizes of the particles formed. In U.S. application Ser. No. 08/704,316 filed Sep. 19, 1996, a polymer encased liquid crystal particle is formed by swelling a seed particle with a suitable liquid material and polymerizable monomers to form particles of uniform size. The monomers are polymerized to form a polymer which phase separates from the core material resulting in a polymer shell which encapsulates the liquid material. Such liquid crystal particles, having a narrow particle size distribution, and films made therefrom are shown to have improved electro-optical properties.

There are several problems associated with the use of particles formed of polymers encasing core materials. When used, such particles may be exposed to certain conditions, for example, heat or solvents, which may adversely affect the particles. Generally, the stability of such particles is a function of the stability of the polymer shell to heat, solvents, etc., as well as the stability and volatility of the core material. For instance, use of polymers having a lower glass transition temperature ($T_g$) may provide beneficial properties to the polymer. However, low $T_g$ polymers by their nature are less heat stable and will distort and eventually morphologically deteriorate at temperatures above the $T_g$. Also, the core material may decompose or volatilize in response to heat or solvents.

Crosslinking or curing the polymer used to restrict or disperse the core material has been utilized to overcome problems of particle stability. In the majority of methods disclosed in the prior art the polymer shell is either crosslinked after polymerizing the monomers or suitable polymers or prepolymers are provided and then cured by various means. In particular, the aforementioned co-pending application Ser. No. 08/704,316 teaches that the particles of narrow particle size distribution formed therein may be crosslinked after formation of the particles. However, such crosslinking would require additional steps after formation of the particle.

The addition of monomers capable of crosslinking in situ during polymerization to form the polymer shell was thought to be problematic. Specifically, it was believed that the crosslinking monomer(s) would interact with the core material during polymerization leading to improper phase separation and poor or incomplete shell formation. Such interaction could also broaden the particle size distribution. Consequently, there is a need for a process for preparing crosslinked particles of narrow size distribution having discrete polymer shell(s) wherein the particles are formed without additional crosslinking steps after formation of the particle.

The present inventors have now prepared crosslinked particles having discrete polymer shell(s), a narrow particle size distribution and an improved stability to heat and solvents, even when low $T_g$ polymers are used. Moreover, with these particles it is possible to form films without use of adhesive binders. While not wishing to be bound by theory, it is believed that by crosslinking in situ during polymerization of the polymer shell, using the process of the present invention, a polymer shell is obtained which is more efficiently crosslinked than the crosslinking effected after formation of the polymer shell or shells. Moreover, crosslinking occurs without effect from unfavorable crosslinking interactions with the core material and without the requirement of extra steps after particle formation.

In a first aspect of the present invention, there is provided a process for forming a plurality of particles, including the steps of: (A) providing a first emulsion comprising a core material and one or more monomers in an aqueous phase, wherein at least one of the monomers is a monomer containing two or more double bonds and a second emulsion including seed particles; (B) combining the first emulsion and the second emulsion; (C) forming discrete domains, in the aqueous phase, wherein the domains include the core material and the one or more monomers, and (D) polymerizing the one or more monomers to form a plurality of particles, each particle including a discrete crosslinked polymer shell encasing the core material, wherein the plurality of particles have a polydispersity of from 1.3 to 1.0.

In another aspect of the present invention, there is provided a process for forming a plurality of particles, including the steps of: (A) providing a first emulsion comprising a core material in an aqueous phase and a second emulsion comprising seed particles; (B) combining the first emulsion and the second emulsion; (C) forming discrete domains, in the aqueous phase, wherein the domains include the core material; (D) adding one or more monomers to the discrete domains, wherein at least one of the monomers is a monomer containing two or more double bonds; (E) polymerizing the one or more monomers to form a plurality of particles, each particle including a discrete crosslinked polymer shell encasing the core material, wherein the plurality of particles have a polydispersity of from 1.3 to 1.0.

In a further aspect of the present invention, there is provided a plurality of particles, each particle comprising: (A) one or more discrete polymer shells, wherein at least one of the polymer shells is crosslinked with at least one monomer containing two or more double bonds; and (B) a core material encased in the polymer shells, wherein the plurality of particles have a polydispersity of from 1.3 to 1.0.

In a further aspect of the present invention is provided a polymer particle including (A) one or more discrete polymer shells, wherein at least one of the polymer shells is crosslinked with at least one monomer containing two or more double bonds; and (B) a core material encased in the polymer shells, wherein a plurality of the particles have a polydispersity of from 1.3 to 1.0.

In an additional aspect of the present invention is a process for forming a plurality of particles, including the steps of (A) providing (i) a first emulsion including a core material in an aqueous phase, (ii) a second emulsion including seed particles and (iii) one or more monomers, wherein at least one of the monomers is a monomer containing two or more double bonds; (B) combining the first emulsion, the second emulsion and the one or more monomers; (C) forming discrete domains, in the aqueous phase, wherein the domains include the core material; (D) polymerizing the one or more monomers to form a plurality of particles, each particle comprising a discrete crosslinked polymer shell encasing the core material, wherein the plurality of particles have a polydispersity of from 1.3 to 1.0.

In a further aspect of the present invention, there are provided films and articles of manufacture prepared from the particles of the present invention.

As used herein, the expression "(meth)acrylic acid" is intended to include methacrylic acid and acrylic acid. In a like manner, the expression is used in, e.g., methyl (meth)acrylate, ethyl (meth)acrylate, and the like.

The term "double bonds" is known in the art and is understood to refer to bonding wherein two bonds are formed between two atoms, e.g., C=C, C=O, etc.

The term "discrete" is understood to mean separate and distinct.

The term "domain(s)" is understood to mean a discrete, that is a separate and distinct, area or region.

As used herein, the term "domains of narrow size distribution" refers to domains having a size distribution which is substantially monodisperse. In a like manner, the term "particles of narrow size distribution" refers to particles having a size distribution which is substantially monodisperse. The term "monodisperse" refers to a domain or particle size distribution, having a polydispersity (PD), of exactly one (1).

The term "polydispersity" is known in the art as an indicator of the breadth of the domain size (or particle size) distribution. Polydispersity as used herein is calculated from the weight average size, $d_w$, and the number average size, $d_n$, by the formulae:

$PD=(d_w)/(d_n)$.

$d_n = \Sigma n_i d_i / \Sigma n_i$ $d_w = \Sigma n_i d_i d_i / \Sigma n_i d_i$ where $n_i$ is the number of domains (particles) having a size $d_i$.

The term "shell", as used herein, refers to a discrete, water-insoluble layer completely encasing the core material and generally immiscible in the core material.

The term "core material" is understood to include within its scope a single material as well as mixtures of two or more materials. In a like manner, the term "liquid crystal material" is understood to include within its scope a single liquid crystal, mixtures of two or more liquid crystals or a mixture of a liquid crystal(s) with other materials.

The term "switch" is understood to mean changing from a substantially opaque state to a substantially transparent state such as in a liquid crystal containing film.

The term "$N_{max}$" defines the maximum possible number of row electrodes that can be addressed and is defined by the following formula which is known as the iron law of multiplexing (see P. M. Alt and P. Pleshko, IEEE Trans. Elec. Dev. ED-21, 146 (1974)).

$N_{max}=[(s^2+1)/(s^2-1)]^2$ where $s=V_{on}/V_{off}$ and V=voltage.

As used herein, the term "water soluble" means completely soluble in water; "having low water solubility" means having a water solubility at 25–50° C. of no greater than 200 millimoles/liter; and the term "having very low water solubility" means having a water solubility at 25–50° C. of no greater than 50 millimoles/liter. The term "immiscible" is understood to mean being substantially incapable of mixing or blending.

The term "organic" is understood to mean being comprised substantially of hydrogen and carbon atoms, although other atoms such as oxygen, sulfur, nitrogen, halogens, etc. may be included. The term "inorganic" is meant to describe all materials not described as organic herein, although it is recognized that inorganic materials may be derived from non-inorganic precursors.

Throughout this specification and claims, references to percentages are by weight, all temperatures by degree centigrade and all pressures are atmospheric. It is also to be understood that the range and ratio limits, recited herein, may be combined. For instance, if ranges of 1–20 and 5–15 are disclosed for a particular parameter, it is understood that ranges of 1–15 and 5–20 are also contemplated.

In step (A) of the process for preparing a plurality of particles of the present invention, a first emulsion is provided which includes a core material and one or more monomers in an aqueous phase, wherein at least one of the monomers is a monomer containing two or more double bonds.

The core material may be any material which is immiscible in the polymer shell or shells, including liquid, gas, and solid materials as well as derivative materials formed therefrom. In one embodiment, the core material is a gaseous material. Examples of gaseous materials include, but are not limited to, air, nitrogen, helium, carbon dioxide, argon or mixtures thereof. In a preferred embodiment, the core material is a liquid material. The liquid material may generally be any liquid or liquid derived material which has a water solubility conducive to forming liquid domains in an aqueous phase. In one embodiment; the liquid materials have a low water solubility. In a preferred embodiment, the liquids used have a very low water solubility, more preferably, a water solubility of 10 millimoles/liter or below at 25–50° C.

The liquid material may be a reagent, adjuvant or other chemically or biologically active species. The liquid material may also be a solution of a material which is normally a solid at room temperature. The liquid may be a mixture, suspension or emulsion of liquid materials or a single liquid material. In a like manner the liquid may be homogeneous or heterogeneous in nature. The liquids used in this manner according to the present invention may be pure liquids, mixtures or solutions of solid or liquid species in organic solvents.

Examples of liquid materials useful in the present invention include, but are not limited to, liquid crystals, inks, toners, dyes, flavors, fragrances, biocides including pesticides, herbicides, mildicides, insecticides and fungicides, marine anti-fouling agents, pharmaceutical compounds or compositions, and the like.

In one embodiment, the liquid may be an organic liquid. In another embodiment, the organic liquid may be removed by evaporation or solvent extraction, for example during film formation, leaving a void, or air or another gaseous material, or a solid material within the particle. Alternatively, material contained within the particle may be inorganic or partially inorganic in nature, or may be comprised of precursors of inorganic species. For example, appropriately functionalized organic species could be chemically, or otherwise, converted to inorganic salts or complexes while in the particle. Such appropriately functionalized organic species could themselves be part of a mixture or solution with one or more additional liquid or solid species. Complexes of organic ligands with metals may also be incorporated into the species.

In a more preferred embodiment, the core material is a liquid crystal material. Liquid crystal molecules are generally rod-like or disk-like in shape, and have physical properties which are intermediate between those of a crystalline solid and those of an amorphous liquid. The molecules are generally substituted biphenyl or triphenyl, wherein one of the phenyl groups may be separated from the other or others by a spacer group. Examples of liquid crystal materials include: compounds having the formula

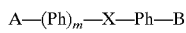

A—(Ph)$_m$—X—Ph—B wherein m is an integer from 1 to 5; A and B are independently selected from: $C_1$–$C_8$ alkyl groups; halogens; cyano groups; haloalkyls; vinylene, acetylene, azo, and azoxy moieties; alkoxy groups having the formula $C_nH_{2n+1}O$, wherein n is an integer from 1 to 8, and ester groups having the formula $C_nH_{2n+1}COO$, wherein n is an integer from 1 to 8. X is a spacer group selected from: $C_1$–$C_8$ alkylene esters; $C_nH_{2n}$, alkyl, wherein n is an integer from 1 to 8; vinylene, acetylene, azo and azoxy groups; and azomethine linkages.

Other examples include biphenyl compounds having the formula A—Ph—Ph—B, wherein A and B are independently selected from: cyano group; halogens; alkoxy groups having the formula $C_nH_{2n+1}O$, wherein n is an integer from 1 to 8, and ester groups having the formula $C_nH_{2n+1}COO$, wherein n is an integer from 1 to 8.

Triphenyl liquid crystal materials may have, for example, halogen, cyano, haloalkyl and alkyl substituents. Another example of a triphenyl liquid crystal material is 4-cyano-4'-(4-[n-pentyl]phenyl)biphenyl. Biphenyl and triphenyl liquid crystal materials are well known in the art and are commercially available.

Generally, any conventional liquid crystals may be employed as the liquid crystal material. Commercially available liquid crystal materials useful in the present invention include, but are not limited to, E7, E9, and TL-205 from E. Merck Co. (Germany). Other liquid crystal materials useful in the present invention are listed in U.S. Pat. No. 4,308,164, and in *Chandrasekhar, S., Liquid Crystals, 2nd Edn.*; Cambridge University Press: Cambridge, 1992. In a preferred embodiment, the liquid crystal used is an operationally nematic liquid crystal. In another embodiment, a mixture of two or more liquid crystal materials is used in the method of the present invention.

The emulsion of liquid crystal material may be from 1 percent to 85 percent, preferably 25 percent to 75 percent, more preferably from 50 percent to 70 percent by weight liquid crystal material by weight of the total emulsion.

The liquid crystal material may include liquid crystal and an additional material. In one embodiment the additional material is a dye. Such a dye may be added, for example, by dissolving the dye in the liquid crystal so that the dye will be transported along with the liquid crystal. Alternatively, the dye may be added separately or may be dissolved in a monomer or solvent. Examples of dyes include pleochroic dyes such as, for example, Oil Blue N, Sudan black B, Sudan 3, Sudan 2, indophenol blue, D-37 (E. Merck), D-43, D-85; and non-pleochroic dyes, such as, for example, water soluble dyes, food coloring dyes, and cloth or fabric dyes. Specific examples of non-pleochroic dyes include FD&C dyes and other dyes listed in U.S. Pat. No. 4,662,720. Typically, a dye is incorporated at a level of 0.1 percent to 10 percent, preferably 0.3 percent to 8 percent, more preferably 0.5 percent to 6 percent by weight of the liquid crystal material.

In addition to the core material, there may also be present in the first emulsion one or more monomers. The total amount of monomer present in the first emulsion may range from 5 percent to 95 percent, preferably 10 percent to 50 percent, and most preferably 15 to 35 percent by weight based on the total weight of monomer and core material. The total amount of monomer within this range includes monomers used as crosslinking monomers. The amount of monomer may be adjusted depending upon the efficiency of polymerization, i.e., conversion, of the monomers.

Monomers useful in the first emulsion are generally those monomers capable of being polymerized into a crosslinked polymer shell. Furthermore, it is also understood that additional polymeric shells may be formed which do not require monomers capable of crosslinking. In a preferred embodiment, the monomers are ethylenically unsaturated monomers. Examples of monomers useful in step (A) include, but are not limited to, aromatic vinyl monomers such as styrene, α-methylstyrene, 2-phenoxyethyl (meth) acrylate, vinyltoluene, ethylvinylbenzene, vinylnaphthalene, and vinyl anthracene; non-aromatic vinyl monomers such as vinyl acetate, vinyl alcohols, vinyl halides, vinylidene halides, acryloyl and methacryloly functional silanes and siloxanes, vinyl silanes and siloxanes, halogenated aromatic monomers, acrylonitrile, acrylic acid, methacrylic acid, $C_1$–$C_{20}$ alkyl esters of acrylic acid, halogenated $C_1$–$C_{20}$ alkyl esters of acrylic acid, $C_1$–$C_{20}$ alkyl esters of methacrylic acid, halogenated $C_1$–$C_{20}$ alkyl esters of methacrylic acid, $C_1$–$C_{20}$ alkyl amides of acrylic acid, $C_1$–$C_{20}$ haloalkyl amides of acrylic acid and methacrylic acid, and $C_1$–$C_{20}$ alkyl amides of methacrylic acid.

Halogenated aromatic monomers include aromatic rings having halogen substituents directly attached to the ring, or present on alkyl groups attached to the ring, such as for example a trifluoromethyl group. Examples of halogenated aromatic monomers include pentaflurophenyl acrylate and pentaflurophenyl methacrylate. Additional useful monomers are those containing crosslinkable functional groups when subjected to the proper conditions such as UV irradiation. Such monomers include, without limitation, hydroxymethacryloxy-propyl 2-benzoylbenzoate. Copolymers, such as those prepared from mixtures of any of the aforementioned monomers, may also be utilized in forming the polymer shells of the present invention.

In one embodiment, at least one of the monomers is styrene. In another embodiment, at least one of the monomers is a (meth)acrylate monomer. Particularly useful (meth)acrylate monomers include methyl methacrylate, hydroxyethyl methacrylate, and 2-ethylhexyl acrylate.

In one embodiment, monomers that contain one or more functional groups which may be converted to an ionic moiety, may be included in the at least one monomers. In an alternative embodiment, monomers that do not contain ionic moieties may be used.

Monomers containing functional groups which may be converted to an ionic moiety include hydrolyzable esters and anhydrides, monomers containing carboxylic acid moieties and monomers containing amine moieties. Examples of monomers containing carboxylic acid moieties include, but are not limited to, acrylic acid, methacrylic acid, (meth) acryloxypropionic acid, itaconic acid, citraconic acid, crotonic acid, maleic acid, maleic anhydride, fumaric acid, monomethyl maleate, monomethyl fumarate, monomethyl itaconic acid, and mixtures of methacrylic and acrylic acid. The use of carboxylic acid containing low molecular weight oligomers, those with molecular weights of less than about 10,000 molecular weight, are included within the scope of the present invention. Examples of monomers containing amine moieties include, but are not limited to, 2-aminoethyl methacrylate, N-methacryloxypiperidine, dimethylaminoethyl methacrylate, vinyl pyridine, 2-(dimethylamino)ethyl (meth)acrylate, 2-(tert-butylamino)ethyl (meth)acrylate, 3-(dimethylamino)propyl (meth)acrylamide, 2-(diethylamino)ethyl (meth)acrylate and 2-(dimethylamino)ethyl (meth)acrylamide. In a preferred embodiment, monomers having acidic moieties which have a pKa of at least 3, such as methacrylic acid and mixtures of methacrylic acid and acrylic acid are utilized. More preferably methacrylic acid is used.

Typically, if used, the amount of monomer convertible to an ionic moiety used will be dependent on the amount of conversion desired. In one embodiment, a monomer convertible to an ionic moiety is used and the amount of monomer conversion to ionic moieties, relative to total monomers present, preferably constitutes up to about 10 percent by weight of the total monomers, more preferably 1 percent to 7 percent, and most preferably 2 percent to 5 percent. However, the amount of monomer containing convertible functional groups is not limited to 10 percent, because the amount of conversion may be less than 100 percent of the available convertible functional groups. Accordingly, monomer convertible to an ionic moiety may be at least 1 percent, preferably at least 5 percent, more preferably at least 10 percent by weight of total monomers present.

As recited above, monomers, not having functional groups convertible to an ionic moiety, may also be included in the total monomers present. Such monomers include, but are not limited to, hydroxy and di-hydroxy alkyl acrylates and methacrylates, such as for example hydroxyethyl acrylate, hydroxyethyl methacrylate, hydroxypropyl methacrylate, and hydroxypropyl acrylate. If such monomers are used they are present from at least 1 percent, preferably at least 5 percent, more preferably at least 10 percent, based on the total weight of all monomers.

Also useful are monomers which have functional groups which provide stabilization against ultraviolet (UV) radiation. Particularly useful are polymerizable hindered amines. Another example of a UV stabilizing monomer is 4-methacryloxy-2-hydroxybenzophenone.

The first emulsion also contains at least one monomer which is a crosslinking monomer. In one embodiment, the crosslinking monomer is a monomer containing two or more polymerizable moieties. In a preferred embodiment, the crosslinking monomer is any monomer containing two or more double bonds capable of free radical polymerization. In a more preferred embodiment, the crosslinking monomer is a polyethylenically unsaturated monomer. Suitable examples include, but are not limited to, at least one of di,-tri-, tetra-, and multi-acrylates, methacrylates, allylics, methallylics, and combinations thereof; di,- tri-, tetra-, and multi-vinyl alkyls; di,- tri-, tetra-, and multi-vinyl aromatics; di,- tri-, tetra-, and multi-functional monomers in which the polymerizable moieties are some combination of acrylic, methacrylic and allylic groups; di,- tri-, tetra-, and multi-alcohol esters of acryloxypropionic acid and methacryloxypropionic acid; acrylate esters of dipentaerythritol ether; methacrylate esters of dipentaerythritol ether; di,- tri-, tetra-, and multi-acryloxypropionic acid esters(AOPA esters).

Specific examples of crosslinking monomers include, but are not limited to, 1,3-butanediol diacrylate; 1,4-butanediol diacrylate; 1,4-butanediol dimethacrylate; 1,4-phenylenediacrylate; 1,4-phenylenedimethacrylate; 1,6-hexanediol diacrylate; 2,2-dimethylpropanediol diacrylate; 2,2-dimethylpropanediol dimeth acrylate; 1,1,1-trimethylolpropane triacrylate; 1,1,1-trimethylolpropane trimrethacrylate; 1,12-dodecanediol dimethacrylate; 1,2,3-trimethylolpropane triacrylate; 1,2,3-trimethylolpropane trimethacrylate; acrylate ester of neopentyl glycol monodicyclopentenyl ether; allyl acryloxypropionate; 3-cyclohexenyl methylene oxyethyl acrylate; 3-cyclohexenylmethylene oxyethyl methacrylate; dicyclopentadienyloxyethyl acrylate; and dicyclopenta- dienyloxyethyl methacrylate.

Particularly useful crosslinking monomers include allyl methacrylate 1,4-butanediol diacrylate and 1,1,1-trimethylolpropane triacrylate. The crosslinking monomer may be present at any concentration, i.e., 0.001 percent up to 100 percent by weight of total monomer. It will be recognized by one of ordinary skill in the art that the amount of crosslinking monomer will vary with the amount of crosslinking desired in the particular polymeric shell(s) and of course will at least partially depend on the particles intended use.

It is to be understood that the one or more monomers may be included in the first emulsion, the second emulsion, the combined first and second emulsion or added to the discrete domains in aqueous phase. That is, they may be added at any point prior to polymerization.

A transport agent may also be used in the process of the present invention. The transfer agent is added before step (C), i.e., forming of the discrete domains. That is, the transport agent may be included in the first emulsion, the second emulsion, both first emulsion and second emulsion or be added to a mixture of the first emulsion and second emulsion before formation of the discrete domains. The transport agent helps to ensure that the core material will swell the seed particle in the forming of discrete domains comprising the core material and monomers. The transport agent is also referred to as a co-solvent, and may be one or more materials selected from solvents and monomers. The co-solvent may be a mixture comprising one or more solvents and one or more monomers. A mixture of co-solvents may be used.

Examples of solvents useful as transport materials in the method of the present invention include, but are not limited to, $C_1$–$C_{12}$ alkyl esters such as ethyl acetate; halogenated $C_1$–$C_{12}$ alkanes such as methylene chloride; $C_1$–$C_{12}$ alkyl ethers such as ethyl ether;, cyclic alkyl ethers such as 2,5-dimethyl-tetrahydrofuran and 2,2,5,5-tetramethyl tetrahydrofuran; $C_1$–$C_{12}$ ketones such as 2-hexanone and methylethyl ketone; $C_1$–$C_{12}$ alcohols such as 1-pentanol, pressurized liquid carbon dioxide and sub- or supercritical carbon dioxide liquid. In one embodiment, the transport agent is a solvent, preferably ethyl acetate.

Examples of monomers useful as transport materials in the method of the present invention include, but are not limited to, $C_1$–$C_{20}$ (meth)acrylates; halogenated $C_1$–$C_{20}$ (meth)acrylates; aryl (meth)acrylates; halogenated aryl (meth)acrylates; hydroxy ethyl (meth)acrylate; hydroxypropyl methacrylate; hydroxypropyl acrylate; vinyl ethers; vinyl halides; and vinylidene halides. In one embodiment, the transport agent is a monomer, preferably methyl methacrylate.

Alternatively, the transport material may be a macromolecular organic compound having a hydrophobic cavity. Such a compound is a polymeric molecule, usually cylindrical or approximately cylindrical, which normally has a hydrophilic exterior and a hydrophobic interior. Such a compound may be used to transport hydrophobic substances in an aqueous environment.

Macromolecular organic compounds having a hydrophobic cavity, useful in the method of the present invention include, but are not limited to, cyclodextrin and derivatives thereof such as , α-cyclodextrin, β-cyclodextrin, and γ-cyclodextrin.; cyclic oligosaccharides having a hydrophobic cavity, such as cycloinulohexose, cycloinuloheptose, and cycloinuloctose, described by Takai et al in *Journal of Organic Chemistry*, 59(11), 2967–2975 (1994); calyxarenes, described in U.S. Pat. No. 4,699,966; and cavitands, described in Italian patent application No. 22522 A/89 and by Moran et al in *Journal of the American Chemical Society*, 184, 5826-28 (1982).

If utilized, the selection of cyclodextrin and derivatives thereof useful in the method of the present invention is determined by the solubility of the cyclodextrin and cyclodextrin derivatives in the aqueous medium and by the solubility of the species formed by the association of the transport agent and the core material. In one embodiment, the transport agent is a macromolecular organic compound, preferably α cyclodextrin, more preferably methylated-β-cyclodextrin having an average of 1.8 methyl groups per D-glucose group.

The amount of transport agent to be used is partly determined by the composition of the transport agent. If the transport agent is a cyclodextrin, the weight ratio of cyclodextrin to core material may range from 1:1000 to 10:100, preferably from 1:100 to 5:100, more preferably 2:100. The lower limit is determined by such things as the desired rate of transport. The upper limit is determined by the required stability of the aqueous system. If the transport agent is a solvent or monomer, the ratio of transport agent to core material is less critical, and will depend upon the desired particle morphology. For example, if a solvent is used, the ratio between solvent and core material may be 10:1 or more. A monomer may be used as the transport agent. The amount of monomer used will be determined by the desired thickness of the shell, and by whether additional monomer will be used in forming the shell.

In one embodiment, at least one transport agent is removed from the discrete domains in aqueous phase after the domains have been formed. The transport agent is removed by means known in the art. For instance, by heating and evaporating the transport agent. In a preferred embodiment, when monomers are added after formation of the discrete domains, at least one transport agent is removed before addition of the monomers.

The first emulsion may also include a surfactant. Common surfactants are well known to those skilled in the art, and may be found in, for example, Porter, M. R., *Handbook of Surfactants*, Chapman and Hall, New York, 1991. Examples of useful surfactants for the present invention include, but are not limited to, ionic surfactants such as, for example, sodium lauryl sulfate, dioctylsulfosuccinates, sodium polyoxyethylene lauryl ether sulfate, sodium dodecyl benzenesulfonate; and non-ionic surfactants such as, for example, glycerol aliphatic esters, polyoxyethylene aliphatic esters, polyoxyethylene alcohol ethers; and stearic acid monoglyceride. In a preferred embodiment, the surfactant is a dioctylsulfosuccinate such as sodium dioctylsulfosuccinate.

The surfactant is generally present in an amount from 0.1 percent to 25 percent or 15 percent or 5 percent by weight based on the total weight of monomers and liquid crystals depending on the type of surfactant used.

The first emulsion may further include a chain transfer agent to modulate the size, i.e., the molecular weight, of the polymers produced. Chain transfer agents include, but are not limited to, mercaptans and polymercaptans, such as t-dodecyl mercaptans and hexanethiol; alcohols, such as isopropanol, isobutanol, lauryl alcohol, and t-octyl alcohol and polyhalogen compounds, such as carbon tetrachloride, tetrachloroethylene, and trichlorbromoethane. The amount of chain transfer agent used may be from about 5 percent to about 20 percent by weight of the emulsion, although amounts above 20 percent may be required depending on the molecular weight desired. A preferred chain transfer agent is hexanethiol.

The first emulsion may also further include a polymerization initiator. Water soluble and water insoluble (oil soluble) initiators may be used. In a preferred embodiment, a water insoluble initiator is use, more preferably t-butyl peroctoate is used.

Examples of water insoluble initiators include, but are not limited to, diisobutyryl peroxide, acetylcyclohexylsulfonyl peroxide, dibenzyl peroxy dicarbonate, di(2-ethylhexyl) peroxydicarbonate, dicyclohexyl peroxydicarbonate, di(sec-butyl) peroxydicarbonate, diisopropyl peroxydicarbonate, 2,4-dichloro benzoyl peroxide, t-butyl peroxypivalate, isononanoyl peroxide, decanoyl peroxide, lauroyl peroxide, propionyl peroxide, 1,1,3,3-tetramethylbutyl peroxy-2-ethyl hexanoate, 2,5-dimethyl-2,5-bis(2-ethylhexanoylperoxy) hexane, acetyl peroxide, succinic acid peroxide, t-butyl peroctoate, benzoyl peroxide, t-butyl peroxy isobutyrate, t-butyl peroxymaleic acid, 1-hydroxy-1-hydroperoxy dicyclohexyl peroxide, 1,1-bis(t-butylperoxy)-3,3,5-trimethylcyclohexane, t-butyl peroxy crotonate, 2,2-bis(t-butylperoxybutane, 1-butylperoxy isopropyl carbonate, 2,5-dimethyl-2,5-bis(benzoylperoxy)hexane, t-butyl peracetate, methyl ethyl ketone peroxides, di-t-butyl diperoxyphthalate, t-butyl per-benzoate, dicumyl peroxide, alpha, alpha í-bis(t-butylperoxydiisopropyl benzene, 2,5-dimethyl-2,5-di (t-butyl peroxy)hexane, 2,4-pentanedione peroxide, di-t-butyl peroxide, 2,5-dimethyl-2,5-di(t-butylperoxy)hexyne-3,1,1,3,3,3-tetra methylbutyl hydroperoxide, t-amyl peroxide, t-amyl peroxyacetate, t-amyl peroxyneodecanoate, t-amyl peroxyneoheptanoate, t-amyl peroxypivalate, t-amyl peroxy-2-ethylhexanoate, t-amyl peroxybenzoate, t-amyl peroxyacetate, 1,1-di(t-amylperoxy)cyclohexane, 2,2-di(t-amylperoxy) propane, ethyl 3,3-di(t-amyl peroxy)butyrate, and O,O-t-amyl O-(2-ethylhexyl) monoperoxy carbonate.

Examples of water soluble polymerization initiators which may be employed include polymerization initiators of the free radical type, such as ammonium or potassium persulfate, which may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in a proportion from about 0.01% or less to 3% each, based on weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). If a water soluble initiator is utilized, it may be necessary to further include an aqueous phase free radical inhibitor such as Maroxol (a nitrosophenol) to reduce or eliminate secondary particle generation.

The first emulsion is generally prepared by combining the desired components in water and subjecting the mixture to high mechanical shearing forces. The water used may be any water suitable for use in such reactions, with de-ionized water being preferred. The shear force may be applied mechanically by using a mechanical disperser, high speed impeller, or other means known in the art for mechanically applying shear forces to a mixture. Alternatively, the emulsion may be obtained ultrasonically by means known in the art.

As indicated above, in alternative embodiments, the one or more monomers may be emulsified separately and then added to the discrete domains of core material formed in the aqueous phase or to the first, second or combination of first and second emulsions. If added to the discrete domains, the crosslinking monomer is incorporated into the discrete domains of core material.

Also, provided in step (A) is a second emulsion including seed particles. The second emulsion is generally a polymer latex. The second emulsion is prepared in aqueous emulsion using emulsion polymerization. Emulsion polymerization techniques are known to those skilled in the art. For example, emulsion polymerization techniques are discussed in U.S. Pat. Nos. 3,037,952 and 2,790,736, as well as in *Emulsion Polymerization Theory and Practice*, D. C. Blackley, Applied Science Publishers Ltd., London(1975). Seed formation is known in the art and is illustrated in, for example, Wu et al., U.S. Pat. No. 5,237,004. The seed may be formed directly (Wu—Example 1) or by preparing a seed for the seed particle (Wu—Example 5) and then preparing the seed (Wu—Example 6).

The seed particle size distribution is generally characterized as having a narrow particle size distribution. In one embodiment, the seed particles have a PD of 1.3 to 1.0, or 1.2 to 1.0, or 1.1 to 1.0. In a preferred embodiment, the seed particles have a PD of 1.05 to 1.0, more preferably 1.01 to 1.0, most preferably 1.005 to 1.0. Seed particles have been produced with a PD as low as 1.002 and it is contemplated that seed particles with even lower PDs may be produced. The PD of the seed particles used is important in influencing the PD of the particles produced using the seed. The PD of the particles formed by the method of the present invention are limited by the PD of the seed particles used in forming them. That is, the PD of the particle produced cannot be lower than the PD of the seed used. Accordingly, the seed PD serves as the lower limit of the particle PD and the size desired for the seed particles is determined by the target particle size.

Generally, it is desirable to provide a second emulsion containing seed particles with diameters of a size range from 50 nanometers to 1 micron, preferably from 150 nanometers to 750 nanometers, and more preferably 500 nanometers. Larger seed diameters, up to about 5 microns, can be achieved by non-emulsion processes whereby an emulsion-derived seed is swollen with monomer and polymerized. Seed particles of a useful size range may be prepared with surfactant concentrations of from about 0.1 weight percent to about 5 weight percent, based on the total weight of monomers and core material, depending on the type of surfactant used. When non-ionic surfactants are used, it may be preferred to use up to about 10 weight percent surfactant.

Generally, the monomers utilized to form the seed particles are those disclosed above. Preferably, the monomers used in preparing the seed particles are ethylenically unsaturated monomers. Examples of such monomers are disclosed above.

The amount of seed particles in the seed emulsion is determined by the final desired concentration of seed particle in the mixture and may range up to 50 percent seed particles by weight, and has no theoretical lower limit.

In alternative embodiments, the one or more monomers, at least one transport agent, or both are included in the second emulsion in addition to or lieu of being present in the first emulsion. The monomers and transport agents are as described above.

The first emulsion is combined with the second emulsion in step (B). The order of addition is not critical. The combination of the first emulsion of core material and the second emulsion of seed particles generally will not significantly alter the weight percent of core material in the final emulsion.

The weight ratio of core material to seed particle preferably ranges from 1500:1 to 1:1, more preferably 1000:1 to 5:1, and most preferably 100:1 to 10:1.

In alternative embodiments, the one or more monomers, at least one transport agent, or both may be added to the combination of the first emulsion and the second emulsion. The monomers and transport agents are as described above.

After combining the first emulsion and the second emulsion in step (B) discrete domains of core material, in an aqueous phase, are formed in step (C). The combined emulsions are mechanically agitated at a rate sufficient to cause intimate mixing of the two emulsions. However the agitation is not so severe that shear forces cause coalescence of particles or particle breakdown. During agitation the seed particles are swelled by the core material and monomers as well as other materials which may be included in the first emulsion, thus forming discrete domains which include the core material, monomers, and if used, other optional materials in the aqueous phase. The discrete domains, so formed, have a narrow particle size distribution. In one embodiment, the discrete domains have a PD of 1.3 to 1.0, or 1.2 to 1.0, or 1.1 to 1.0. In a preferred embodiment, the discrete domains have a PD of 1.05 to 1.0, more preferably 1.01 to 1.0, most preferably 1.005 to 1.0.

Once formed, the monomers contained within the discrete domains are polymerized to form the desired particles.

The monomers are polymerized by methods known in the art. Accordingly, the monomers may be polymerized by aqueous suspension, emulsion or dispersion polymerization. Preferably, the monomers are polymerized by aqueous suspension polymerization. Polymerization may be carried out as a batch, continuous, or semi-continuous reaction. Preferably, the polymerization is carried out as a batch reaction. Preferably, the polymerization is free radical polymerization. However, the present invention is not limited to free-radical polymerization and other forms of polymerization may also be used including, but not limited to, polycondensation polymerization. See for example, U.S. Pat. No. 3,577,515.

Upon polymerization, a discrete phase of polymers is formed as one or more polymer shells. As the monomer(s) are polymerized, the crosslinked polymer formed phase separates from the core material to form one or more polymer shells which surround the core material.

The polymerization is generally performed in a range from 60° C. to 120° C., preferably from 70° C. to 110° C., and more preferably from 80° C. to 100° C.

Formation of more than one shell may be accomplished by sequential polymerization in more than one stage. It is preferred that the hydrophilicity of the polymers in each stage not be the same after neutralization. Hydrophilicity refers to the affinity of the polymers for the aqueous phase. Polymers of sufficiently different hydrophilicity will form, upon neutralization, discrete adjacent shells or interpenetrating shells representing a gradient of composition. The neutralization of the polymer stages is a preferred embodiment and is not required. The difference in hydrophilicity may be accomplished by using different monomers in each stage, or by using the same monomers but in different ratios.

Formation of more than one shell may also be accomplished by simultaneous polymerization of monomers having reactivities sufficiently different that they would not be likely to react together to form a random copolymer.

The plurality of particles of the present invention include one or more discrete polymer shells, where at least one of the shells is crosslinked as described above, enclosing a core material. The composition of the polymer shells and the core material is as described above.

Generally the particles of the present invention have a particle size of from 0.15 μm to 15 μm, preferably 0.5 μm to 5 μm, more preferably 1 μm to 3 μm.

The particle size distribution of the plurality of particles of the present invention is characterized as being a narrow particle size distribution. In one embodiment, the particles have polydispersities of 1.3 to 1.0, or 1.2 to 1.0, or 1.1 to 1.0. In a preferred embodiment, the particles have a PD of 1.05 to 1.0, more preferably 1.01 to 1.0, most preferably 1.005 to 1.0. The size distributions of the particles formed by the method of the present invention are influenced by the particle size distributions of the seed particles used in forming them. Under optimal conditions, particles may be obtained having a polydispersity of less than 1.005. However, as explained above the PD of the particles will not be lower than the PD of the seed particles used to form them.

The particles have a high temperature stability, even when monomers capable of producing low $T_g$ polymers in the absence of crosslinking monomers are utilized to form the polymeric shell. Generally, the heat stability of the particles is the lower of the decomposition temperature of the polymer shell or the core material or is dependent on the boiling point of the core material such that a temperature is identified wherein substantial vaporization of the core material occurs. Actually, in many situations where the boiling point is exceeded, the core material will volatilize and the shell will retain its structure so that a hollow shell will be produced.

Consequently, the temperature at which a change in the morphology of the particle occurs is greater than in conventional particles. It is understood that the extent of the improvement will be dependent on the amount of crosslinking monomer used. For example, when 10 percent crosslinking monomer is present there will be no or very little effect on morphology up to at least 150° C. and when 100 percent crosslinking monomer is used there will be no effect on morphology up to the lower of the decomposition temperature of the polymer shell or the core material.

The particles of the present invention also enjoy other properties which are dependent on the amount of crosslinking monomer used. For instance:

(1) there is a reduced amount of soluble polymer fraction which may be extracted from the particles ranging to no soluble fraction for those particles having 100 percent crosslinking monomer;

(2) uptake of solvent by the particles is reduced ranging to no solvent uptake for those particles having 100 percent crosslinking monomer; and (3) the crosslinked polymer shell(s) have an elevated $T_g$ ranging to no $T_g$ for those particles having 100 percent crosslinking monomer.

Accordingly, a plurality of particles may be produced which have a very narrow particle size distribution and varying properties as to stability depending on the amount of crosslinking monomer used to produce the polymeric shell.

The present method allows preparation of particles which are adhesive in nature both towards each other and towards a substrate surface or surfaces to which it may be bound. Accordingly, the plurality of particles may be formed into films, layers, etc. without the use of adhesive binders. Depending on the composition of the particles, many of the particles will be adhesive at or below room temperature, while others will fuse at temperatures up to 200° C. or more.

Alternatively, the particles may be used with adhesive binders for stronger binding of the particles to each other and to substrates, for better lamination, and for better maintenance of the original shape of the particles. Such binding adhesives are described below.

The particles of the present invention may be used to form films. Particularly, liquid crystal films can be prepared from particles containing a liquid crystal material as a core material. Such films will switch when a switching voltage or other appropriate switching force is applied. The films generally have switching voltages which are less than the switching voltage of films formed from conventional particles or dispersions. Films formed from particles of the present invention have a switching voltage of 2.0 volts per micron thickness or less, preferably, 1.0 volts per micron thickness of film or less, and more preferably, 0.5 volts or less per micron thickness of film.

Liquid crystal-films formed from particles formed according to the present invention are generally formed by drying a dispersion or suspension of the formed particles. The dispersion or suspension may be spread on the desired surface, such as an indium tin oxide (ITO) or other suitable electrode coated substrate surface. Coating of the ITO surfaces may be accomplished by methods known in the art, such as spin-coating, Doctor blade application, knife over roll, and gravure printing.

A further result of the present method is a film comprising crosslinked polymer encased liquid crystal particles having a narrow particle size distribution that can be multiplexed. In particular, mutiplexing is contemplated which allows for passive matrix addressing. Multiplexing allows reduction in the number of display interconnections by addressing matrix row and column electrodes rather than individual pixel electrodes. Using particles of the present invention with a liquid crystal core material $N_{max}$ is greater than 2. Preferably, the present invention provides levels of multiplexing providing for the capability to display 7-segment, or alpha-numeric, characters, i.e., $N_{max}$ values of greater than about 4. More preferably, the present invention provides levels of multiplexing providing for the capability to display 13-segment, or Kanji, characters, i.e., $N_{max}$ values of greater than about 8. Most preferably, the present invention provides even higher levels of multiplexing capabilities, i.e., $N_{max}$ values of greater than 16.

In an alternative embodiment, the processes of the present invention may include a further step wherein the core material is removed. If the core material is a liquid material the liquid may be removed, by evaporative, extraction or other means known to the art, from the particle, leaving either a solid, or gaseous material or a void space which is substantially a vacumn surrounded by the polymeric shell (s). If extraction is used, extraction may be performed by any solvent which can extract the core material. For instance, the extraction can be done using methylene chloride, ether, heptane or acetone. The extraction may be done by methods known in the art. For example, the particles may be soaked in solvent, followed by vacuum filtration while washing the particles with additional solvent. The core material can then be recovered in the supernatant. In another embodiment, the core material may be removed using evaporation, such as rotary evaporation.

The resulting materials are generally hollow particles having one or more polymeric shells surrounding the space vacated by the core material. Generally, the space previously occupied by the core material is filled with air or gas from the ambient atmosphere by diffusion. Consequently, the core material in the hollow particles is a gaseous material as described above. However, it is also contemplated that the space may be substantially a vacum. Such materials have been found to be useful as opacifying agents in resin blends, particularly in transparent resins including, but not limited to, polyvinyl chloride, poly methyl methacrylate, polyolefins, polystyrene, polyester, or polycarbonate. Accordingly, in one embodiment of the present invention, is an article of manufacture including at least one resin and particles of the present invention wherein the particles have a gas core material and are dispersed within the resin.

Although the particles can be formed into films without the use of binding agents, binding agents may be used in some instances to form the films. Polymers useful in forming films with the particles of the present invention include film-forming latex polymers and water soluble polymers. Film-forming latex polymers and water soluble polymers may be used alone or in combination with one another. Examples of film-forming latex polymers useful in forming films include polyethylene, polyurethane, polysiloxane, polybutadiene, copolymers of butadiene and styrene; homopolymers and copolymers of: $C_1$–$C_{20}$ acrylates and methacrylates; halogenated $C_1$–$C_{20}$ acrylates and methacrylates; aryl acrylates and methacrylates; hydroxy ethyl acrylate and methacrylate; hydroxypropyl methacrylate; hydroxypropyl acrylate; vinyl ethers; vinyl halides; vinylidene halides, fluorocarbons, hydroxy-methacryloxy-propyl 2-benzoylbenzoate and mixtures thereof. Examples of water soluble polymers include polyvinyl alcohol, poly-N-vinyl pyrrolidone, carboxymethylcellulose, gelatin, hydroxyethylcellulose, partially saponified polyvinyl acetate, polyacrylamide, polyethylene oxide, polyethyleneimine, polyvinylalkyl ethers, polyacrylic acid copolymers of polyacrylic acid, polyethylene glycol, sodium polystrenesulfonate. Preferred water soluble polymers are polyvinyl alcohol and poly-N-vinyl pyrrolidone.

The particles may be isolated in powder form after removal of the aqueous phase. Isolated particles may be redispersed in aqueous or nonaqueous liquids. Following isolation, it may be desired, for example, to form a mixture of particles having two or more sizes. A mixture may be formed by combining isolated particles or, preferably, by combining dispersions of particles. Alternatively, a mixture of particle sizes may be obtained by carrying out the primary swelling described hereinabove, using seed particles having different particle sizes. Upon forming a film comprising a mixture of particles having two or more sizes, allows for stepwise switching and greater control of film opacity.

The following abbreviations are used in the examples which follow as well as in other portions of the specification.

| | |
|---|---|
| PELC | Polymer encased liquid crystal |
| PDLC | Polymer dispersed liquid crystal |
| MAA | Methacrylic acid |
| MMA | Methyl methacrylate |
| HEMA | Hydroxyethyl methacrylate |
| HEA | Hydroxyethyl acrylate |
| 2-EHA | 2-ethylhexyl acrylate |
| MA | Methyl acrylate |
| BA | Butyl acrylate |
| Sty | Styrene |
| TMPTA | 1,1,1-trimethylolpropane triacrylate |
| BDDA | 1,4 butanediol diacrylate |
| ALMA | Allyl methacrylate |
| LC | Liquid crystal |
| E7 | Merck liquid crystal mixture (cyano type) |
| TL205 | Merck liquid crystal mixture (fluorinated type) |
| t-BPO | tert-Butyl peroctoate |
| Ht | Hexanethiol |
| Et2O | Ethyl ether |
| MDC | Methylene chloride (CH2Cl2) |
| DOSS | Sodium dioctyl sulfosuccinate |
| PS | Particle size |
| SEM | Scanning electron microscope |
| RI | Refractive Index |
| PD | Polydispersity |
| BI-DCP | Brookhaven Instruments-Disc Centrifuge Photosedimentometer |
| PVC | Polyvinyl chloride |

The following examples are provided as an illustration of the present invention.

EXAMPLE 1

Preparation of Crosslinked Particles Using 1% ALMA Cross-linker

An emulsion was prepared by combining 369 parts of Merck E7 liquid crystal, 140 parts of monomer/initiator solution (MMA/HEMA/Sty/ALMA/t-BPO=67.8/22.5/8.7/1/3.5), 92 parts of DOSS soap solution (2% solution in water), 364 parts of DI water, and 22 parts of methylated β-cyclodextrin (50.8% solution in water), Wacker Company, and then emulsifyng at a very high shear for 2 minutes. A polymer emulsion latex, 170 parts, BA/Sty/Ht=82/18/19 (28% polymer by weight, 0.562 micron particle size), was added to the emulsified LC/monomer mixture. The sample was subjected to mild agitation for 24 hours at room temperature and then viewed under the microscope at 500X to find particle droplets having a narrow size distribution.

The above mixture, which is 50% non-aqueous, was diluted to 20% non-aqueous with an additional 163 parts of water. The reaction mixture was added to a sealed pressure tube and subjected to mild agitation in a hot water bath at 85° C. for 1 hour, then 95° C. for another hour. The sample was then dried and examined by SEM microscopy. SEM showed uniform PELC particles having a narrow particle size distribution. The resulting particles had a 1.25 micron size.

The produced particles were crushed in a mortar and pestle in liquid nitrogen and the LC extracted out with heptane. SEM of this sample showed cracked hollow spheres. The presence of crosslinking was verified by adding the dried PELC particles to MDC. The particles swelled to a jelly like mass rather than being dissolved. Uncrosslinked particles readily dissolve in many solvents, especially MDC.

EXAMPLE 2

Preparation of Crosslinked Particles using 100% BDDA Ccross-linker

An emulsion of 369 parts of Merck E7 liquid crystal, 140 parts of monomer/initiator solution (BDDA/t-BPO=100/3.5), 92 parts of DOSS soap solution (2% solution in water), 364 parts of DI water, and 22 parts of methylated β-cyclodextrin (50.8% solution in water), Wacker Company, were emulsified at very high shear for 2 minutes. A polymer emulsion latex, 170 parts, BA/Sty/Ht=82/18/19 (28% polymer by weight, 0.562 micron particle size), was added to the emulsified LC/monomer mixture. The sample was then subjected to mild agitation for 24 hours at room temperature and then viewed under the microscope at 500×to find particle size droplets having a narrow size distribution.

The above mixture, which is 50% non-aqueous, was diluted to 20% non-aqueous with an additional 163 parts of water. The reaction mixture was added to a sealed pressure tube and subjected to mild agitation in a hot water bath at 85° C. for 1 hour, then 95° C. for another hour. The sample was then dried and examined by SEM microscopy. SEM showed uniform PELC particles of narrow particle size distribution. The resulting particles had a 1.25 micron size.

The produced particles were crushed in a mortar and pestle in liquid nitrogen and extracted with heptane. SEM of this powder sample showed cracked hollow spheres.

The integrity of the particles was tested by heating the powder. Uncrosslinked PELC particles will distort, i.e., swell, flow, and permanently lose original structure at a temperature around their glass transition temperature (typically about 60–80° C. depending on the exact composition and level of plasticization by the LC). The powder was heated to 170° C. on a hot plate and under a heat lamp. No effect from the heat was observed. SEM showed the particles were unchanged.

The highly crosslinked shell of the particles is unaffected by solvents. The dried powder was added to MDC and ether. No swelling or loss of particle shell integrity was observed, but the solvent extracted the LC quantitatively from the core. The extracted shells were separated from the solvent/LC solution by centrifugation of the supernatant. These particles are amenable to washing by centrifugation due to their extremely rigid nature. The liquid crystal was recovered by rotary evaporation of the supernatant. SEM showed particles which looked identical to the original PELC particles before the solvent and centrifugation treatment. The shells are perfectly hollow as evidenced by SEM of liquid $N_2$ fractured specimens of the recovered shell. The hollow particles readily redisperse into MDC, but float in water.

EXAMPLE 3
Preparation of Crosslinked Particles using 100% TMPTA Cross-linker Added after Droplet Formation An emulsion was prepared by combining 362 parts of Merck TL205 liquid crystal, 725 parts of ethyl ether. 188 parts of DOSS solution (2% solution in water), 508 parts of DI water, and 45 parts of methylated P-cyclodextrin (50.8% solution in water), Wacker Company, and then emulsifying at very high shear for 4 minutes. A polymer emulsion latex, 500 parts, BA/Sty/Ht=82/18/19 (10.00% polymer by weight, 0.562 micron particle size), was added to the emulsified LC mixture. The sample was then subjected to mild agitation for 120 minutes at 85° C. The sample was then viewed under the microscope at 500× to find droplets that having a narrow droplet size distribution. The ethyl ether was removed by heating and bubbling nitrogen through the sample.

A monomer solution, 138 parts, (100 parts TMPTA and 3.5 parts of t-BPO) was emulsified with 23 parts of DOSS solution (2% solution in water), and 110 parts of DI Water. This mixture was added to the LC emulsion from above. In several minutes the monomer was incorporated into the LC droplets.

The above mixture was diluted to 20% non-aqueous with 90 parts of water. The reaction mixture was added to a sealed pressure tube and was subjected to mild agitation in a hot water bath at 85° C. for 1 hour and then an additional 1 hour at 95° C. The sample was then dried and examined by SEM microscopy. SEM showed particles of narrow particle size distribution. The resulting particles had a 1.25 micron size.

The produced particles were crushed in a mortar and pestle in liquid nitrogen and extracted with heptane. SEM of this sample shows cracked hollow spheres.

The 20% particle emulsion was mixed at 25° C. with a film forming binder polymer latex 2-EHA/Sty/HEA/MAA/MA=50.6/23.9/20/0.5/5 which had been presaturated with 25% TL205 LC. The ratio of dried particles to dry binder was 1:1. Seven (7) grams of IRN-150, Rohm and Haas mixed bed deionizing ion exchange beads were then added. The IRN beads remove ionics, including the soap sodium dioctyl sulfosuccinate, which was present at about 1000 ppm. The deionization is monitored with a conductivity probe. Initially the reading was off scale (>200 ppm). However, after about 30 minutes the reading was about 100 micromhos, corresponding to <100 ppm total ionics. The sample was then filtered through a burette packed with fine glass wool, and then through a 20 micron stainless steel screen. The sample was degassed under vacuum. The sample emulsion which was about 28% non-volatile was drawn down on a 36 centimeter×13 centimeter×1.1 millimeter ITO coated glass substrate using a 10 centimeter doctor blade (Gardner type), at a gap setting of 0.051 millimeters, which was set with a feeler gauge. Owing to a clean glass substrate and the correct viscosity of the mixture, wetting of the mixture was good. The sample was placed in a vacuum oven overnight at 25° C. The dry film weight was calculated to be 20 microns by dividing the weight of the dry film by the area of the dry film in the appropriate units (wt in grams×10000/area in centimeters). The density of the film was about 1 g/cm3. The next day, after further storage in a vacuum, 5 centimeter×7.5 centimeter samples were cut for polymer dispersed liquid crystal (PDLC) device fabrication. ITO coated Mylar was used as the top substrate. The top piece is laminated using a laminator. The device is then sealed all around the perimeter of the device using melted paraffin wax (mp=56° C.).

The sample was then tested for switching voltage using a HeNe laser and detection device. The beam was normalized to read 100% transmission through air. The electro-optical performance was typical of a polymer dispersed liquid crystal containing PELC.

EXAMPLE 4
Preparation of Crosslinked Particles using 10% TMPTA Cross-linker

An emulsion was prepared by combining 369 parts of Merck E7 liquid crystal, 140 parts of monomer/initiator solution (MMA/HEMA/Sty/TMPTA/t-BPO=58.8/22.5/8.7/10/3.5), 92 parts of DOSS soap solution (2% solution in water), 364 parts of DI water, and 22 parts of methylated β-cyclodextrin (50.8% solution in water), Wacker Company, and then emulsifying at very high shear for 2 minutes. A polymer emulsion latex, 170 parts, BA/Sty/Ht=82/18/19 (28% polymer by weight, 0.562 micron particle size), was added to the emulsified LC/monomer mixture. The sample was then subjected to mild agitation for 24 hours at room temperature and then viewed under the microscope at 500× to find droplets having a narrow size distribution.

The above mixture, which was 50% non-aqueous, was diluted to 20% non-aqueous with an additional 163 parts of water. The reaction mixture was added to a sealed pressure tube and subjected to mild agitation in a hot water bath at 85° C. for 1 hour, then 95° C. for another hour. The sample was then dried and examined by SEM microscopy. SEM showed PELC particles having a narrow particle size distribution. The resulting particles have a 1.25 micron size. The produced particles were crushed in a mortar and pestle in liquid nitrogen and extracted with heptane. SEM of this sample showed cracked hollow spheres.

A PDLC film was made directly from the particles. A sample of the particle dispersion was dried under a heat lamp at 150° C. The resulting film was fractured under liquid nitrogen and the LC was extracted with heptane. SEM showed a PDLC film wherein the LC had been removed and the resulting voids were perfectly uniform with a cavity size precisely the same as the LC core of the original PELC. Another PDLC film was prepared from pure particles at 150° C. for electro-optical response as in Example 3. The sample performed as a typical PDLC containing PELC.

EXAMPLES 5–9

Particles were prepared as in Examples 1, 2 and 4, except that the crosslinking monomer component was as shown in Table 1. The PD of each sample was determined using BI-DCP. The results are shown in Table 1.

TABLE 1

| Examples | Crosslinker | Crosslinker % | PD |
|---|---|---|---|
| 5 | ALMA | 1% | 1.017 |
| 6 | TMPTA | 1% | 1.019 |
| 7 | ALMA | 10% | 1.015 |
| 8 | TMPTA | 100% | 1.007 |
| 9 | TMPTA | 10% | 1.013 |

The resultant PDs illustrate that particles are produced having a narrow particle size distribution which is substantially monodisperse, i.e., a PD of 1.0.

EXAMPLE 10
Preparation of Hollow Particles using 100% TMPTA Crosslinker

An emulsion was prepared by combining 125 parts of dioctyl phthalate (DOP), 50 parts of TMPTA, 1.75 parts of t-BPO, 33 parts of DOSS solution (2% solution in water), 112 parts of DI water, and 8 parts of methylated, β-cyclodextrin (50.8% solution in water, Wacker Company), and then emulsifyng at a high shear rate for 2 minutes. A polymer emulsion latex, 84 parts, BA/Sty/Ht=82/18/19 (10.00% polymer by weight, 0.306 micron particle size), was added to the emulsified mixture. The sample was then subjected to mild agitation for 8 hours at room temperature.

The above mixture was diluted to 20% non-aqueous with 587 parts of water. The reaction mixture was added to a sealed pressure tube and was subjected to mild agitation in a hot water bath at 85° C. for 1 hour and then an additional 1 hour at 95° C. The sample was then vacuum-dried and examined by SEM microscopy. SEM showed uniform spherical particles of narrow particle distribution. The resulting particles had a 600 nanometer diameter. SEM of the sample showed cracked hollow spheres when the particles were cryofractured and extracted with heptane.

Both DOP-filled and intact hollow spheres were dried for use as opacifying agents in a vinyl resin blend. Removal of the dioctyl phthalate core material was accomplished using solvent extraction and washing of the particles as described in Example 2.

The DOP-filled and hollow cross-linked particles were each dry blended with a clear polyvinyl chloride formulation. The mixtures comprised 5 parts of cross-linked particles to 100 parts of PVC resin (Borden Chemical Products, BCP-57). The blends were mixed using a Haake Rheocord (50 rpm) at 175° C. for 10 minutes. Plaques (3.8 cm×5.1 cm) were prepared using a Reliable Press operating at a temperature of 190° C. The pressing operation applied 9 metric tons for 3 minutes, followed by 63 metric tons for 2 minutes and a 5-minute cooling period at 63 metric tons.

Light scattering properties of the resulting plaques (0.3 cm thick) were measured using a Hunter Lab optical sensor. A control plaque using the same PVC formulation but containing no cross-linked particles was also prepared. Table 2, below, shows differences in the optical properties of the matrix polymer with and without cross-linked additives. The ratio of diffusely transmitted (scattered) light to total transmittance, $T_d/T_t$, in each sample of the same thickness gives the percent haze values. Plaques containing the hollow sphere additives produced in this example exhibited the highest scattering properties.

TABLE 2

| Sample | Haze | Total Transmittance ($T_t$) | Diffuse Transmittance ($T_d$) |
|---|---|---|---|
| Control (BCP-57) | 12.4 | 57.80 | 7.15 |
| BCP-57/DOP-filled TMPTA particles (100:5) | 46.2 | 57.51 | 26.55 |
| BCP-57/Hollow TMPTA particles (100:5) | 75.0 | 44.23 | 33.18 |

What is claimed is:

1. A process for forming a plurality of particles, comprising the steps of:
    (A) providing a first emulsion comprising a core material and one or more monomers in an aqueous phase, wherein at least one of the monomers is a crosslinking monomer containing two or more double bonds capable of free radical polymerization, and a second emulsion comprising seed particles;
    (B) combining the first emulsion and the second emulsion;
    (C) forming discrete domains, in the aqueous phase, wherein the domains comprise the core material and the one or more monomers, and
    (D) polymerizing the one or more monomers by free radical polymerization to form a plurality of particles, each particle comprising a discrete crosslinked polymer shell encasing the core material,
    wherein the plurality of particles have a polydispersity of from 1.3 to 1.0.

2. The process of claim 1, wherein the core material comprises liquid crystal material.

3. The process of claim 1, wherein at least one transport agent is added prior to step (C).

4. The process of claim 1, further comprising forming at least one additional polymer shell on the crosslinked polymer shell encasing the core material.

5. The process of claim 1, wherein the core material is an operationally nematic liquid crystal.

6. A process for forming a plurality of particles, comprising the steps of:
    (A) providing a first emulsion comprising a core material in an aqueous phase and a second emulsion comprising seed particles;
    (B) combining the first emulsion and the second emulsion;

(C) forming discrete domains, in the aqueous phase, wherein the domains comprise the core material and the seed particles;

(D) adding one or more monomers to the discrete domains, wherein at least one of the monomers is a crosslinking monomer containing two or more double bonds capable of free radical polymerization;

(E) polymerizing the one or more monomers by free radical polymerization to form a plurality of particles, each particle comprising a discrete crosslinked polymer shell encasing the core material, wherein the plurality of particles have a polydispersity of from 1.3 to 1.0.

7. The process of claim 6, wherein the core material is liquid crystal material.

8. The process of claim 6, wherein at least one transport agent is added prior to step (C).

9. The process of claim 8, wherein at least one transport agent is removed after the forming of the discrete domains.

10. The process of claim 6, further comprising forming at least one additional polymer shell on the crosslinked polymer shell encasing the core material.

11. The process of claim 6, wherein the core material is an operationally nematic liquid crystal.

12. A process for forming a plurality of particles, comprising the steps of:

(A) providing
  (i) a first emulsion comprising a core material in an aqueous phase,
  (ii) a second emulsion comprising seed particles; and
  (iii) one or more monomers, wherein at least one of the monomers is a crosslinking monomer containing two or more double bonds capable of free radical polymerization;

(B) combining the first emulsion, the second emulsion, and the one or more monomers;

(C) forming discrete domains, in the aqueous phase, wherein the domains comprise the core material, the seed particles and the one or more monomers;

(D) polymerizing the one or more monomers by free radical polymerization to form a plurality of particles, each particle comprising a discrete crosslinked polymer shell encasing the core material, wherein the plurality of particles have a polydispersity of from 1.3 to 1.0.

13. The process of claim 12, wherein the core material is a liquid crystal.

14. The process of claim 12, wherein the core material is an operationally nematic liquid crystal.

* * * * *